United States Patent [19]
Kotikovsky

[11] Patent Number: 5,145,123
[45] Date of Patent: Sep. 8, 1992

[54] SEAT BELT RETRACTOR WITH VEHICLE SENSITIVE LOCKING MECHANISM

[75] Inventor: Alexander P. Kotikovsky, Southfield, Mich.

[73] Assignee: TRW Vehicle Safety Systems Inc., Lyndhurst, Ohio

[21] Appl. No.: 353,077

[22] Filed: May 17, 1989

[51] Int. Cl.⁵ .................................... B60R 22/40
[52] U.S. Cl. .................................... 242/107.4 A
[58] Field of Search ........... 242/107.4 A; 280/806; 297/478, 480

[56] References Cited

U.S. PATENT DOCUMENTS

| | | | |
|---|---|---|---|
| 3,897,913 | 8/1975 | Hall | 242/107.4 A |
| 3,901,460 | 8/1975 | Dully et al. | 242/107.4 A |
| 3,938,754 | 2/1976 | Stephenson et al. | 242/107.4 A |
| 3,938,755 | 2/1976 | Stephenson et al. | 242/107.4 A |
| 4,285,479 | 8/1981 | Blom | 242/107.4 A |
| 4,556,177 | 12/1985 | Kuwakado et al. | 242/107.4 A |
| 4,844,374 | 7/1989 | Mori | |

Primary Examiner—John M. Jillions
Attorney, Agent, or Firm—Tarolli, Sundheim & Covell

[57] ABSTRACT

A seat belt retractor for use in a selected one of a plurality of different orientations in a vehicle comprises a spindle on which seat belt webbing can be wound. The spindle is supported for rotation in belt retraction and belt withdrawal directions. A pawl is supported for pivotal movement from a first position to a second position in which rotation of the spindle in the belt withdrawal direction is blocked. An inertia member is supported for pivotal movement from an unactuated position in which the inertia member extends substantially vertically to an actuated position in which the inertia member is pivotally displaced from the unactuated position in response to deceleration of the vehicle at the rate of deceleration above a predetermined rate of deceleration. A sensor is interposed between the pawl and the inertia member. Upon movement of the member to its actuated position, a surface on the member engages the sensor to move the pawl to its second position. The sensor is selected from a plurality of sensors having different configurations depending upon the orientation of the inertia member in its unactuated position relative to the pawl when the retractor is in its selected orientation.

12 Claims, 3 Drawing Sheets

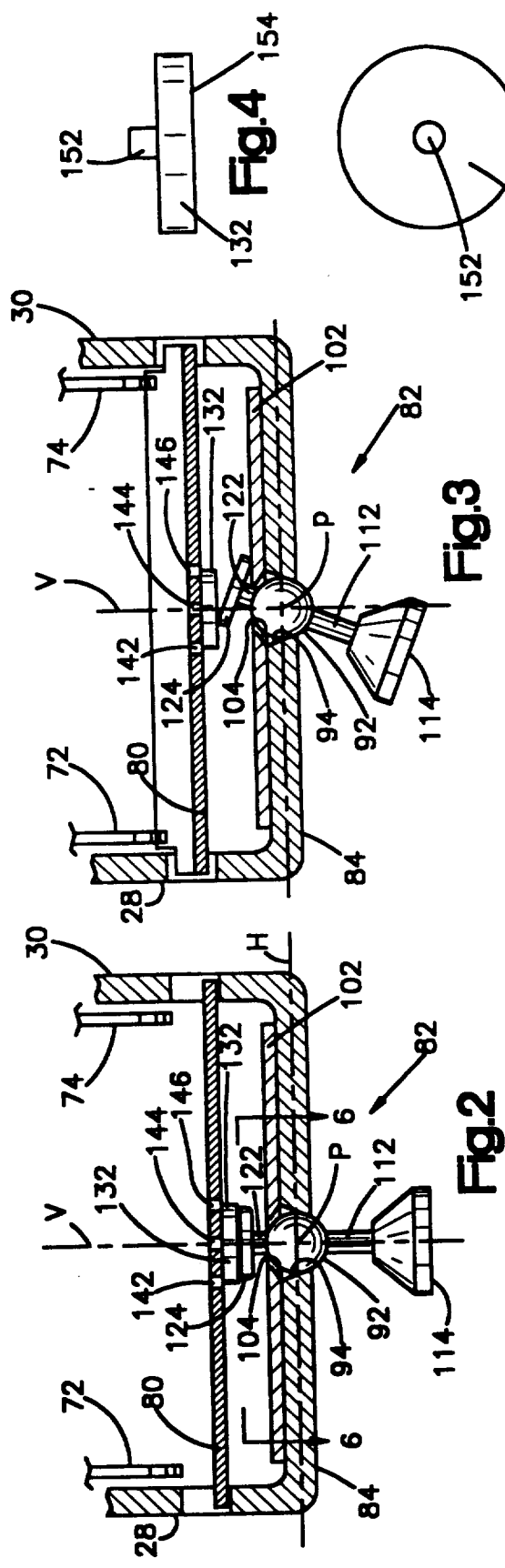

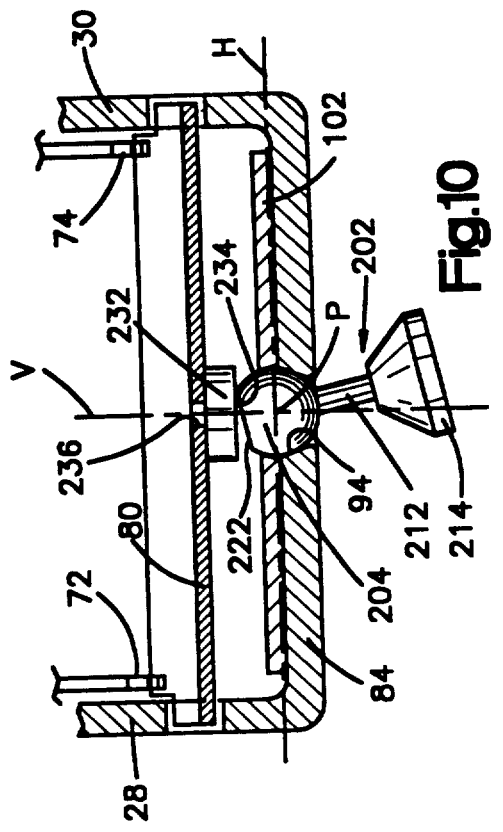
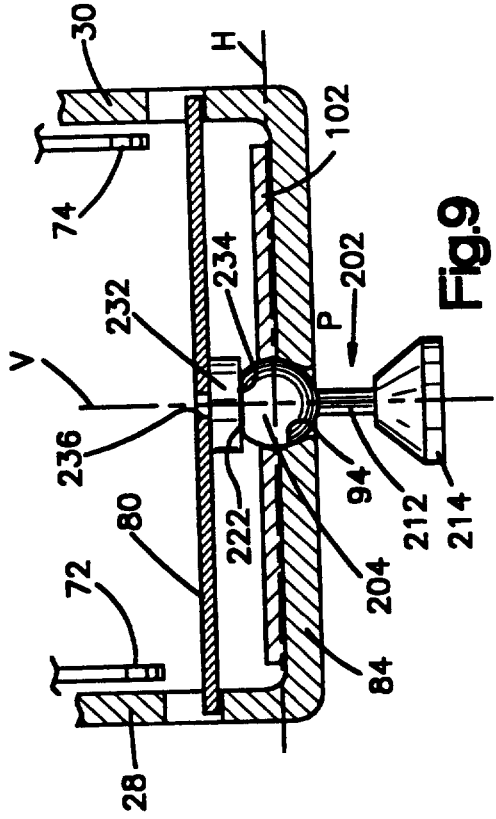
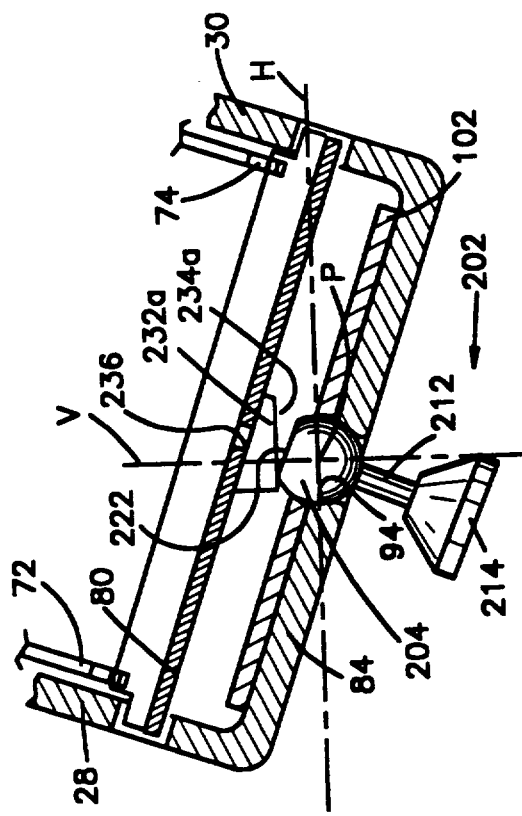
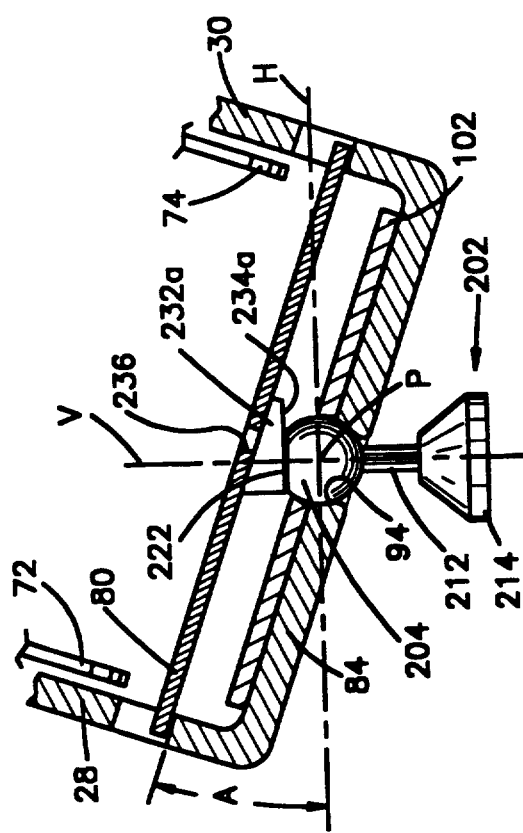

SEAT BELT RETRACTOR WITH VEHICLE SENSITIVE LOCKING MECHANISM

BACKGROUND OF THE INVENTION

1. Technical Field

The present invention relates to a seat belt retractor for use in a vehicle. Particularly, the present invention relates to a seat belt retractor having an inertia actuated locking pawl and to a method of assembling the retractor.

2. Description of the Prior Art

A seat belt retractor for restraining a vehicle occupant in emergency situations typically includes a spool with seat belt webbing wound on the spool. The spool is supported for rotation in belt withdrawal and belt retraction directions. A locking mechanism comprises a pair of ratchet wheels fixed to the spool, a pivotally mounted pawl, and an inertia member, such as a pendulum, for pivoting the pawl into engagement with the ratchet wheels. The locking pawl is biased by a spring or by gravity to a position disengaged from the ratchet wheels. Movement of the inertia member from an unactuated position, in response to deceleration or other rapid change in the movement of the vehicle, causes the locking pawl to pivot into engagement with the ratchet wheels and lock the spool against rotation in the belt withdrawal direction.

The inertia member is suspended in a generally vertical direction in its unactuated position so the safety belt may be freely withdrawn by the vehicle occupant without locking the spool. However, it is desirable to mount the retractor in various positions and in different orientations within different vehicles, or even within the same vehicle. Thus, it is necessary to design different supports for the inertia member to accommodate different retractor mounting positions or orientations and still suspend the inertia member vertically.

U.S. Pat. No. 3,938,754 discloses a seat belt retractor including a pendulum supported by a flywheel. The pendulum engages a post attached to a locking pawl and upon movement of the pendulum the pawl is pivoted to lock the retractor. The flywheel is pivotally supported by the retractor so the pendulum is suspended vertically regardless of the orientation of the retractor.

U.S. Pat. No. 3,938,755 discloses a pendulum housing supported for pivotal movement. A pendulum is supported by the pendulum housing and engages a post attached to a locking pawl of the retractor to pivot the pawl. The pendulum is in a vertical orientation regardless of the orientation of the retractor.

U.S. Pat. No. 4,556,177 discloses a pendulum pivotally supported by a spherical housing which, in turn, is pivotally supported by the seat belt retractor. The retractor may be mounted in a vehicle in a number of different orientations without having to change parts so the pendulum is suspended vertically. The pendulum moves an intermediate actuating rod which moves a pivotable lever which, in turn, pivots the pawl.

U.S. Pat. No. 3,897,913 discloses a pendulum supported for pivotal movement by a bearing having a semi-spherical portion received in a semi-spherical recess. A planar surface of the bearing engages a plunger which engages a spring biased locking control member.

SUMMARY OF THE INVENTION

A seat belt retractor for use in a selected one of a plurality of different orientations in a vehicle comprises a spindle on which seat belt webbing can be wound. The spindle is supported for rotation in belt retraction and belt withdrawal directions. A ratchet wheel is fixed to the spindle. A plurality of ratchet teeth extend from the ratchet wheel. A pawl is supported for pivotal movement from a first position spaced from the ratchet wheel to a second position engaging one of the plurality of ratchet teeth on the ratchet wheel to block rotation of the spindle in the belt withdrawal direction. An inertia member includes a bearing supporting the inertia member for pivotal movement from an unactuated position, in which the inertia member extends substantially vertically, to an actuated position pivotally displaced from the unactuated position in response to deceleration of the vehicle at a rate of deceleration above a predetermined rate. The inertia member has a planar surface. A sensor is attached to the pawl for engagement by an edge of the planar surface of the inertia member upon movement of the inertia member to its actuated position to move the pawl to its second position. The sensor is selected from a plurality of sensors having different configurations depending upon the orientation of the inertia member in its unactuated position relative to the pawl when the retractor is in its selected orientation in the vehicle.

In one embodiment, the inertia member comprises a stub shaft protruding from the inertia member bearing. The inertia member planar surface is located on the stub shaft and is spaced from the inertia member bearing. This accentuates movement of the planar surface without increasing the mass of the inertia member.

In this embodiment, the sensor is positioned on the pawl at one of a plurality of different locations. The location of the sensor is substantially aligned with the vertical axis of the inertia member when the inertia member is in its unactuated position, the location of the sensor being dependent upon the orientation of the inertia member in its unactuated position relative to the pawl.

In a second embodiment, the inertia member planar surface is located on the inertia member bearing. In this embodiment, the distance between the planar surface of the inertia member and the pivot axis of the bearing is such that the sensor need be positioned at only one location on the pawl.

BRIEF DESCRIPTION OF THE DRAWINGS

Further features of the present invention will become apparent to those skilled in the art to which the present invention relates from reading the following specification with reference to the accompanying drawings, in which:

FIG. 2 is a partial view of the retractor of FIG. 1;

FIG. 3 is a view similar to FIG. 2 with parts in different positions;

FIG. 4 is an enlarged view of a part used in the retractor of FIG. 2;

FIG. 5 is a top view of the part of FIG. 4;

FIG. 6 is an enlarged view of a portion of FIG. 2, taken approximately along line 6—6 in FIG. 2;

FIGS. 7 and 8 are views similar to FIGS. 2 and 3 of the retractor of FIG. 1 mounted in different orientations and having a modified construction;

FIGS. 9 and 10 are views similar to FIGS. 2 and 3 of another embodiment of the present invention; and FIGS. 11 and 12 are views similar to FIGS. 9 and 10 of the retractor of FIG. 9 mounted in a different orientation and having a modified construction.

DESCRIPTION OF PREFERRED EMBODIMENTS

Figure 1:
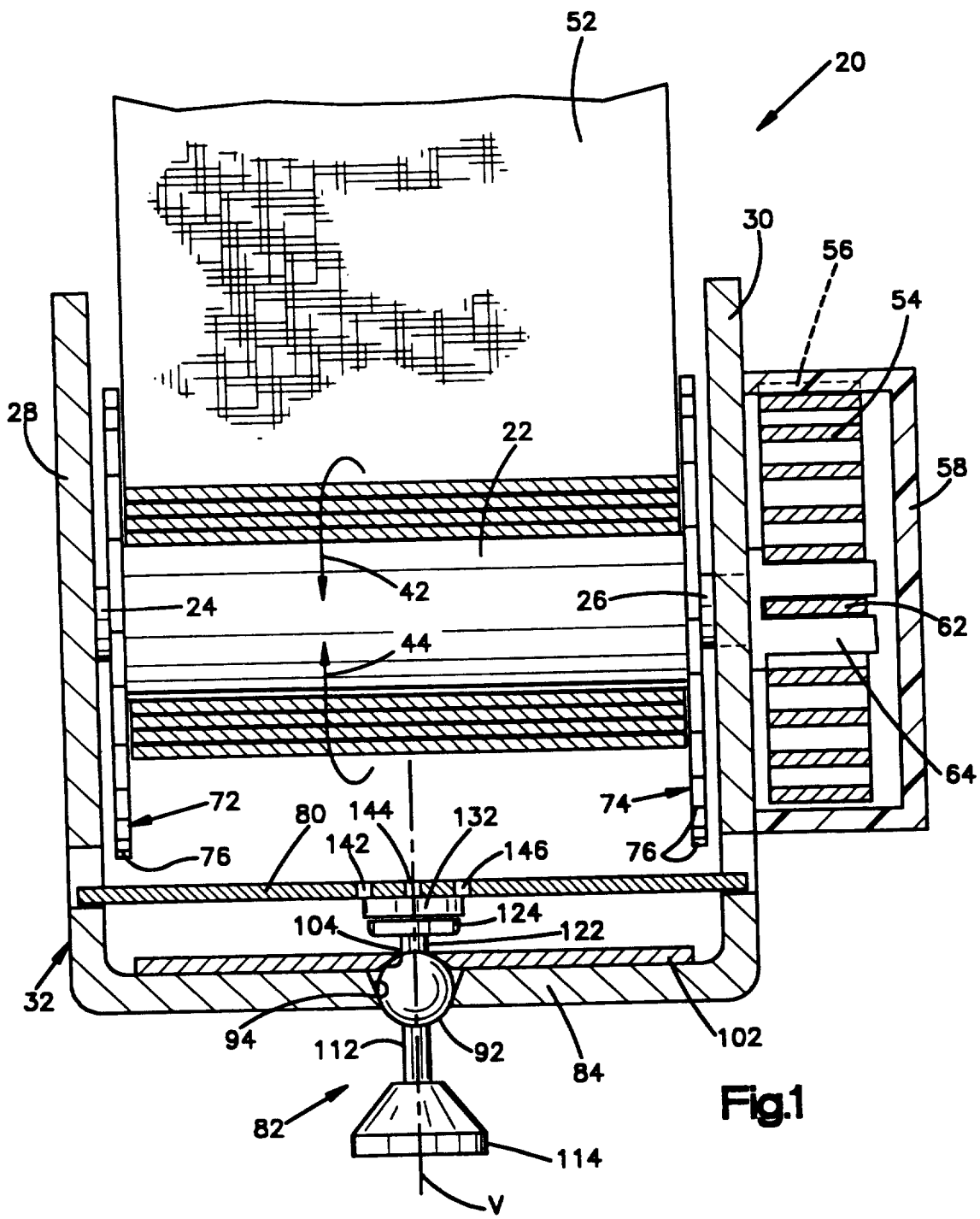
FIG. 1 is a sectional view of a seat belt retractor including a locking mechanism embodying the present invention.

A seat belt retractor 20 for use in an automotive vehicle is illustrated in FIG. 1. The seat belt retractor 20 includes a spindle 22. A pair of stub shafts 24 and 26 are connected to the spindle 22 and extend axially from opposite ends of the spindle. Each of the stub shafts 24 and 26 is received in an opening in a respective side 28, 30 of a frame 32 of the retractor 20. The stub shafts 24, 26 support the spindle 22 for rotation in a belt withdrawal direction 42 and a belt retraction direction 44.

Seat belt webbing 52 is connected at one end to the spindle 22 and is wound on the spindle for storage. The belt webbing 52 is extendable about an occupant of the vehicle. A return spring 54 has one end 56 connected to a spring cover 58 which is attached to the frame side 30. The other end 62 of the spring 54 is connected to an extension 64 of stub shaft 26. The spring 54 biases the spindle 22 to rotate in the belt retraction direction 44 which tends to pull the belt webbing 52 against the vehicle occupant.

Two ratchet wheels 72 and 74 are connected to the spindle 22 at axially spaced locations adjacent each frame side 28, 30. A plurality of ratchet teeth 76 extend radially outward from each of the ratchet wheels 72, 74 and are equally spaced about the outer periphery of the ratchet wheels. A locking pawl 80 extends between sides 28, 30 of the frame 32 and is supported in the frame 32 for pivotal movement. The pawl 80 is pivotable from a position disengaged from the ratchet wheels 72, 74 to a position engaging the ratchet wheels to block rotation of the spindle 22 in the belt withdrawal direction 42.

A pendulum-type inertia member 82 is supported for pivotal movement by a support beam 84 extending between the frame sides 28, 30. The inertia member 82 is supported in an unactuated position extending along a vertical axis V. The inertia member 82 pivots relative to the beam 84 from an unactuated position, as illustrated in FIG. 2, to an actuated position displaced from the vertical axis, as illustrated in FIG. 3, in response to acceleration or deceleration of the vehicle at a rate above a predetermined rate.

In FIGS. 2 and 3, the seat belt retractor 20 is mounted in the vehicle so that the beam 84 extends in a direction generally parallel to a horizontal axis H. The inertia member 82 includes a spherical bearing 92 received in a frustoconical seat 94 centered in beam 84. A cap 102 is secured to the upper surface of beam 84 to retain the bearing 92 within the seat 94. The cap 102 has a frustoconical surface 104 which engages the bearing 92.

A pendulum arm 112 extends downwardly, as viewed in FIG. 2, from the spherical bearing 92. An inertia weight 114 is fixed to the end of the pendulum arm 112. The inertia member 82 has a pivot point P lying within a plane defined by beam 84 at the center of the bearing 92. When the vehicle, to which the retractor 20 is mounted, accelerates or decelerates in any direction extending transverse to the vertical axis V at a rate above a predetermined rate, the inertia member 82 pivots about the pivot point P from its unactuated position, as illustrated in FIG. 2, to its actuated position, as illustrated in FIG. 3.

An upper shaft 122 extends from the spherical bearing 92 opposite the pendulum arm 112. The shaft 122 supports an enlarged head portion 124. The head portion 124 has a circular planar surface 126 (FIG. 6) of a diameter slightly greater than the diameter of the bearing 92. Upon pivotal movement of the inertia member 82, the head portion 124 engages a sensor 132 attached to the underside of pawl 80. The edge of the planar surface 126 defines an arcuate path during pivotal movement of the inertia member 82. This arcuate path of movement of the inertia member 82 forces the sensor 132 to pivot and the sensor 132 forces the pawl 80 to pivot to engage the ratchet wheels 72, 74. The longitudinal length of upper shaft 122 of the inertia member 82 in combination with the diameter of the planar surface 126 of the head portion 124 is sufficient to insure that the periphery of the surface 126 defines an arcuate path of a radius effective to force the pawl 80 upward into positive engagement with the ratchet wheels 72 and 74.

Three mounting openings 142, 144 and 146 are spaced transversely across the pawl 80. The openings 142, 144, 146 are in a line extending parallel to the spindle 22. The sensor 132 has a pin 152 (FIGS. 4 and 5) positionable in one of the mounting openings 142, 144, 146. The pin 152 may be threaded or otherwise securable to the pawl 80.

In FIGS. 2 and 3, the sensor 132 is secured in the centermost opening 144, which is located along the vertical axis V. The sensor 132 has a circular planar contact surface 154 (FIG. 4) which is slightly greater in diameter than the diameter of the surface 126 of the head portion 124. This assures that the head portion 124 of the inertia member 82 will not catch and bind on an edge of the sensor 132 during pivotal movement of the inertia member from the unactuated position (FIG. 2) to the actuated position (FIG. 3).

In FIGS. 7 and 8, the seat belt retractor 20 is positioned in the vehicle so that the spindle 22 and locking pawl 80 are located at an angle A (FIG. 7) relative to the horizontal axis H. The angle A may vary depending on the exact application. In this position, the beam 84 of the retractor 20 is, similarly angled relative to the horizontal axis H. When the retractor 20 is so mounted, the inertia member 82 adopts an unactuated position still along the vertical axis V, as shown in FIG. 7, which is angled relative to the beam 84. The inertia member 82 is similarly angled relative to the locking pawl 80.

Because of the orientation of the retractor 20, the vertical axis V and longitudinal central axis of the inertia member 82 intersect the locking pawl 80 at a location spaced to the left of the center mounting opening 144 in the pawl (as shown in FIG. 7). The sensor 132 is, thus, replaced by a sensor 132a positioned in the leftmost opening 142 in the pawl 80. The sensor 132a has a wedge shape, as viewed in FIGS. 7 and 8, so it has a contact surface 154a which extends substantially parallel to surface 126 of the head portion 124 and substantially parallel to the horizontal axis H but which extends at an angle to the locking pawl 80. The sensor 132 or 132a is adapted to be attached to the pawl 80. However, it should be apparent to those skilled in the art that the sensor could as well be a member, adapted to be attached to the upper head portion 124 of the inertia member 82, configured to function in a manner similar to the sensor 132 or 132a.

The inertia member 82 moves to an actuated position from its unactuated position along the vertical axis V during rapid deceleration of the vehicle at a rate above a predetermined rate. As described above, the peripheral edge of the head portion 124 defines an arcuate path which causes displacement of the sensor 132a and pivoting of the pawl 80 into engagement with the ratchet wheels 72, 74, as shown in FIG. 8.

If the retractor 20 is mounted with an orientation opposite of that shown in FIG. 7 or 8, then the sensor 132a would be located in the rightmost opening 146 rather than the leftmost opening 142 in the pawl 80. The sensor 132a would also be turned so that its contact surface 154a adopts a substantially horizontal orientation parallel with the surface 126 of the inertia member 82. Thus, the inertia member 82 would lie on the vertical axis V.

As described above, the retractor 20 is adapted for mounting in the vehicle in any one of three orientations by merely using the appropriate sensor 132 or 132a in the retractor, and positioning that sensor in either the central position in opening 144, or one of the positions in the opening 142 or 146 on either side of the central position. It is possible to adapt this structure to more than three orientations, if desired, by providing additional positions of openings in the pawl 80 and different sensor configurations. Also, the amount of movement of the sensor 132 or 132a and pawl 80 is to a degree a function of the length of the upper shaft 122 of the inertia member 82. This amount of movement can be increased or decreased by simply varying the length of the upper shaft 122 as desired.

In another embodiment of the present invention illustrated in FIGS. 9-12, the principles involved are the same as those set forth above. For example, an inertia member 202 (FIG. 9) has a semi-spherical bearing 204 seated in the frustoconical seat 94 of the beam 84. The bearing 204 is provided with a downwardly extending pendulum arm 212 to which an inertia weight 214 is attached. The spherical bearing 204 has a planar surface 222 (FIG. 10) facing upwardly.

A sensor 232 is fixed to the pawl 80. The sensor 232 has a generally cylindrical configuration with a planar contact surface 234 and is located in a single central opening 236 in the pawl 80. The cylindrically-shaped sensor 232 is used when the retractor 20 is mounted in a vehicle with the beam 84 extending parallel to the horizontal axis H. The opening 236 is aligned with the vertical axis V and the longitudinal central axis of the pendulum arm 212 when the pendulum is in its unactuated position extending along the vertical axis V. The contact surface 234 extends substantially parallel to the horizontal axis H. Pivotal movement of the inertia member 202 causes the edge of the surface 222 of the bearing 204 to move in an arcuate path displacing the sensor 232. The sensor 232, in turn, pivots the pawl 80 upwardly into engagement with the ratchet wheels 72, 74.

FIGS. 11 and 12 show the configuration of a sensor 232a when the retractor 20 is positioned so the pawl 80 extends at an angle A relative to the horizontal axis H. The sensor 232a has a wedge shape with an angled surface 234a which is at an angle to the orientation of the pawl 80 and arranged generally parallel to the horizontal axis H. Pivotal movement of the inertia member 202 causes the surface 222 to displace the sensor 232a and pivot the pawl 80 upwardly into engagement with the retractor wheels 72, 74.

In the embodiment of FIGS. 9-12, two differently shaped sensors 232 and 232a are used to accommodate three different orientations of the retractor. It is apparent that the sensor 232a can have additional configurations for additional retractor orientations. This would involve merely changing the angle of the surface 234a of the sensor 232a. Also, the sensor 232 or 232a can be attached to the inertia member 202 rather than to the pawl 80.

From the above description of preferred embodiments of the invention, those skilled in the art will perceive improvements, changes and modifications. Such improvements, changes and modifications within the skill of the art are intended to be covered by the appended claims.

Having described preferred embodiments of the invention, I claim:

1. A vehicle-sensitive, inertia operated seat belt retractor for use in a vehicle in a selected one of a plurality of different inclined orientations, said retractor comprising:

a spindle on which seat belt webbing can be wound, said spindle being supported for rotation in belt withdrawal and belt retraction directions;

locking means for blocking rotation of the spindle in a belt withdrawal direction, said locking means being movable from a first position to a second position in which rotation of the spindle in the belt withdrawal direction is blocked;

an inertia member supported for pivotal movement from an unactuated position in which said inertia member extends substantially vertically to an actuated position in which said inertia member is pivotally displaced from the unactuated position in response to deceleration of the vehicle at a rate of deceleration above a predetermined rate, said inertia member having a head portion defining an arcuate path of movement during pivotal movement of said inertia member from its unactuated position to its actuated position;

bearing means for supporting said inertia member in said unactuated position when said retractor is in a one of said orientations and also when said retractor is in another of said orientations inclined with respect to said one orientation; and a sensor interposed between said head portion of said inertia member and said locking means, said sensor including a planar contact surface for engagement with said head portion of said inertia member, said planar contact surface extending in a horizontal plane when said retractor is in one of said inclined orientations, said sensor being adapted to move said locking means to its second position in response to pivotal movement of said inertia member from its unactuated position to its actuated position.

2. The retractor of claim 1 wherein said sensor is selected from a plurality of sensors having different configurations depending upon the orientation of the inertia member in its unactuated position relative to said locking means when the retractor is in its selected orientation in the vehicle.

3. The retractor of claim 1 wherein said locking means comprises a locking pawl including a planar pawl surface having an inclined orientation when said retractor is in one of said inclined orientations, said sensor being mounted to said locking pawl and including a planar mounting surface parallel to said pawl surface.

4. The retractor of claim 3 wherein said inertia member head portion comprises a planar surface parallel to said contact surface of the sensor when the inertia member is in its unactuated position.

5. The retractor of claim 4 wherein said locking means includes means defining different locations on said locking pawl where said sensor may be mounted to said locking pawl.

6. A vehicle sensitive, inertia operated seat belt retractor for use in a selected one of a plurality of different orientations in a vehicle in which it is mounted, said retractor comprising:
- a spindle on which seat belt webbing can be wound, said spindle being supported for rotation in belt withdrawal and belt retraction directions;
- locking means for blocking rotation of the spindle in a belt withdrawal direction, said locking means being movable from a first position to a second position in which rotation of the spindle in the belt withdrawal direction is blocked;
- an inertia member supported for pivotal movement from an unactuated position in which said inertia member extends substantially vertically to an actuated position in which said inertia member is pivotally displaced from the unactuated position in response to deceleration of the vehicle at a rate of deceleration above a predetermined rate, said inertia member comprising a planar surface having edges which define an arcuate path of movement during pivotal movement of the inertia member from its unactuated position to its actuated position;
- bearing means for supporting said inertia member in said unactuated position when said retractor is in one of said orientations and also when said retractor is in another of said orientations inclined with respect to said one orientation;
- a sensor attached to said locking means, said sensor comprising a planar contact surface which is parallel to and contiguous with said planar surface of said inertia member when said retractor is in said selected one of said orientations, said sensor moving said locking means to said second position in response to pivotal movement of said inertia member from said unactuated position to its actuated position;
- said sensor being selected from a plurality of sensors having different configurations depending upon the orientation of said inertia member in said unactuated position relative to said locking means when said retractor is in said selected one of said orientations.

7. A method of assembling a vehicle-sensitive, inertia operated seat belt retractor for use in a selected one of a plurality of different orientations in a vehicle, the retractor comprising:
- a spindle on which seat belt webbing can be wound, the spindle being supported for rotation in belt withdrawal and belt retraction directions;
- locking means for blocking rotation of the spindle in a belt withdrawal direction, the locking means being movable from a first position to a second position in which rotation of the spindle in the belt withdrawal direction is blocked;
- an inertia member supported for pivotal movement from an unactuated position in which the inertia member extends vertically to an actuated position in which the inertia member is pivotally displaced from the unactuated position in response to deceleration of the vehicle at a rate of deceleration above a predetermined rate, the inertia member having a head portion defining an arcuate path of movement during pivotal movement of the inertia member from its unactuated position to its actuated position; and
- a sensor interposed between the head portion of the inertia member and the locking means, the sensor including at least two generally opposed surfaces, one of the opposed surfaces being contiguous with one of the head portion and the locking means, the sensor moving the locking means to its second position in response to the pivotal movement of the inertia member from its unactuated position to its actuated position; said method comprising the steps of:
- providing a bearing means for supporting said inertia member in said unactuated position when said sensor is in any one of said orientations;
- providing a plurality of sensors having different configurations depending upon the orientation of the inertia member in its unactuated position relative to the locking means when the retractor is in its selected orientation in the vehicle;
- selecting from the plurality of sensors the sensor to be interposed between the head portion of the inertia member and the locking means; and
- attaching said sensor to said locking means.

8. A method as defined in claim 7 wherein said sensor may be attached to said locking means in any one of a plurality of positions and further including the step of attaching the selected sensor to the locking means in a selected one of the plurality of positions.

9. A vehicle-sensitive, inertia operated seat belt retractor for use in a selected one of a plurality of different orientations in a vehicle, said retractor comprising:
- a spindle on which seat belt webbing can be wound, said spindle being supported for rotation in belt withdrawal and belt retraction directions;
- locking means for blocking rotation of the spindle in a belt withdrawal direction, said locking means being movable from a first position to a second position in which rotation of the spindle in the belt withdrawal direction is blocked;
- an inertia member supported for pivotal movement from an unactuated position in which said inertia member extends substantially vertically to an actuated position in which said inertia member is pivotally displaced for the unactuated position in response to deceleration of the vehicle at a rate of deceleration above a predetermined rate, said inertia member having a head portion defining an arcuate path of movement during pivotal movement of said inertia member from its unactuated position to its actuated position; and
- a sensor interposed between said head portion of said inertia member and said locking means, said sensor including at least two generally opposed surfaces, one of said opposed surfaces being contiguous with one of said head portion and said locking means, said sensor being adapted to move said locking means to its second position in response to pivotal movement of said inertia member from its unactuated position to its actuated position;
- said sensor being selected from a plurality of sensors having different configurations depending upon the orientation of the inertia member in its unactuated position relative to said locking means when the retractor is in its selected orientation in the vehicle;

said sensor being affixed to said locking means, one of said generally opposed surfaces of said sensor being a planar contact surface, and said head portion having a portion which engages said contact surface of said sensor during pivotal movement of said inertia member from said unactuated position and arcuate movement of said head portion, the other of said generally opposed surfaces of the sensor being a planar surface angled with respect to said contact surface;

said inertia member head portion comprising a planar surface parallel to said contact surface of said sensor when said inertia member is in said unactuated position; and said locking means having means defining different locations thereon where said sensor may be positioned.

10. A vehicle-sensitive, inertia operated seat belt retractor for use in a selected one of a plurality of different orientations in a vehicle, said retractor comprising:

a spindle on which seat belt webbing can be wound, said spindle being supported for rotation in belt withdrawal and belt retraction directions;

a pawl supported for pivotal movement from a first position to a second position in which rotation of the spindle in the belt withdrawal direction is blocked;

an inertia member including a bearing member supporting said inertia member for pivotal member from an unactuated position in which said inertia member extends substantially vertically to an actuated position in which said inertia member is pivotally displaced from the unactuated position in response to deceleration of the vehicle at a rate of deceleration above a predetermined rate, said inertia member having a longitudinal axis and a planar surface with edges that define an arcuate path of movement about a point on said axis during pivotal movement of said inertia member from its unactuated position;

a sensor attached to said pawl for engagement by an edge of said planar surface of said inertia member upon movement of said inertia member to its actuated position to move said pawl to its second position;

said sensor being selected from a plurality of sensors having different configurations based on the selected orientation of the retractor in the vehicle, said sensor also being located on said pawl at a position substantially aligned with said longitudinal axis of said inertia member when said retractor is in its selected orientation and said inertia member is in its unactuated position; and said inertia member comprising a stub shaft that supports said planar surface of said inertia member at a position spaced from said inertia member bearing.

11. The retractor of claim 10 wherein said pawl comprises mean for positioning the sensor at different positions on the pawl depending upon the orientation of the inertia member longitudinal axis relative to said pawl when the inertia member is in its unactuated position.

12. A seat belt retractor for attachment to a vehicle, said retractor comprising:

a spindle on which seat belt webbing can be wound, said spindle being supported for rotation in belt withdrawal and belt retraction directions;

a ratchet wheel fixed to said spindle and having a plurality of ratchet teeth extending from said ratchet wheel;

a pawl supported for pivotal movement form a first position spaced from said ratchet wheel to a second position engaging one of said plurality of ratchet teeth on said ratchet wheel to block rotation of said ratchet wheel and said spindle in the belt withdrawal direction;

an inertia member including a bearing supporting said inertia member for pivotal movement from an unactuated position in which said inertial member extends substantially vertically to an actuated position in which said inertia member is pivotally displaced from the unactuated position in response to deceleration of the vehicle at a rate of deceleration above a predetermined rate, said inertia member having a planar surface;

a sensor attached to said pawl for engagement by an edge of said planar surface of said inertia member upon movement of said inertia member to its actuated position to move said pawl to its second position;

said sensor being selected from a plurality of sensors having different configuration based on the orientation of said inertia member in its unactuated position relative to said pawl when the retractor is in a selected orientation in the vehicle;

said inertia member comprising a stub shaft protruding from said inertia member bearing, said inertia member planar surface being located on said stub shaft and spaced from said inertia member bearing.

* * * * *

UNITED STATES PATENT AND TRADEMARK OFFICE
CERTIFICATE OF CORRECTION

PATENT NO. : 5,145,123

DATED : September 8, 1992

INVENTOR(S) : Alexander P. Kotikovsky

It is certified that error appears in the above-identified patent and that said Letters Patent is hereby corrected as shown below:

Column 10, Line 28, Claim 12, change "inertial" to --inertia--.

Column 10, Line 41, Claim 12, change "configuration" to --configurations--.

Signed and Sealed this

Twenty-eighth Day of September, 1993

Attest:

BRUCE LEHMAN

Attesting Officer

Commissioner of Patents and Trademarks